United States Patent Office 3,153,033
Patented Oct. 13, 1964

3,153,033
PHENYLAZO FORMAMIDINES OF
PRIMARY AMINES
Norbert Steiger, Nutley, N.J., assignor to Hoffmann-La
Roche Inc., Nutley, N.J., a corporation of New Jersey
No Drawing. Filed Nov. 20, 1961, Ser. No. 153,695
3 Claims. (Cl. 260—205)

This invention relates to a process for the production of formamidines from primary amines and to the novel compounds produced by the process.

The process of this invention comprises reacting a non-aliphatic primary amine or a hydrohalide thereof with formamide or a lower alkyl formamide in the presence of an arylsulfonyl halide or a thionyl halide to produce the formamidine of the primary amine as illustrated by the following reaction schemes:

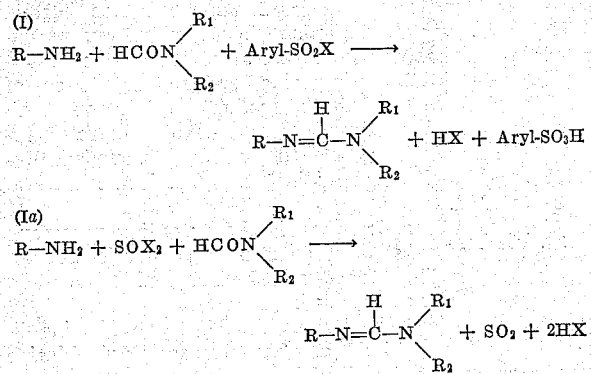

In the above formulae R represents a cyclic group, X represents halogen and $R_1$ and $R_2$ each represents hydrogen or lower alkyl.

The cyclic groups represented by R in the formula above are unsubstituted or substituted monocyclic or polycyclic groups containing five or more atoms and at least one double bond in the ring system. One or more electronegative groups may be attached to the ring. These cyclic groups include aromatic hydrocarbons, hydroaromatic hydrocarbons, nitrogen-, oxygen- or sulfur-heterocyclics containing at least one unsaturated linkage, and fused hydrocarbon or heterocyclic ring systems containing at least one unsaturated linkage in the ring system. Illustrative of the different types of cyclic groups, i.e. those represented by R in Formula I, are the following: phenyl, anthraquinone, biphenyl, pyridine, quinoline, pyrimidine, isoxazole, thiazole, triazine, uracil, benzothiazole, etc. The ring systems described above may bear one or more substituents, e.g. carboalkoxy groups such as carbo-lower alkoxy, for example $COOCH_5$, and di-lower alkylaminocarbo-lower alkoxy, for example,

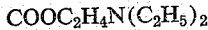

alkylamino; acylamino groups such as lower alkanoylamino, for example, $NHCOCH_3$; ether and thioether groups such as lower alkoxy and lower alkylmercapto, for example, $CH_3O$, $C_2H_5O$, and di-lower alkylamino-lower alkoxy, for example, $(C_2H_5)_2NC_2H_4O$; alkyl groups, preferably lower alkyl such as methyl, ethyl, propyl, etc.; electronegative acid radicals derived from organic or inorganic acids, such as the halogens, $SO_2$, $NO_2$, $OH$, $COOH$, $SO_3H$, sulfamyl, acyl groups such as lower alkanoyl groups, for example, $CH_3CO$, aroyl groups such as benzoyl and substituted benzoyl groups, such as trifluoromethylbenzoyl, arsonyl, thiocyano, and the like.

The primary amino group which takes part in the condensation reaction must be directly attached to the cyclic portion of the molecule. One or more such primary amino groups present on the nucleus may react. As indicated above, it is also necessary that there be at least one unsaturated linkage in the ring system. The aryl sulfonyl halide which must be present includes benzenesulfonyl halides, toluenesulfonyl halides, xylenesulfonyl halides, etc., preferably the first two, especially the chlorides thereof. Thionyl halides such as thionyl chloride may also be used. Preferably monoalkyl formamide, such as methylformamide, and dilower-alkyl formamide, such as dimethylformamide, diethylformamide, etc. are used in the process, lower alkyl formamides, in particular. Compounds bearing very strongly electronegative substituents, e.g. p-nitroaniline, react also with formamide.

When the primary amine contains one or more electronegative substituents on the ring, either the free base itself or its hydrohalide will ordinarily react according to the process of this invention. Strongly basic primary amines, such as aminopyridine, aminoquinaldine, aniline, p-phenetidine, etc., however, readily form sulfonamides with benzenesulfonyl halides or toluenesulfonyl halides, especially in the presence of an acid binding agent such as pyridine and even formamide or dimethyl formamide. In order to produce formamidines from such strongly basic amines according to the process of this invention, it is therefore usually necessary in this instance to use as starting material the hydrohalic salt, preferably the hydrochloride, of the amine. Then the reaction proceeds as in Formula I or Ia above and a formamidine instead of a sulfonamide is obtained.

At least one equivalent of the formamide compound for each reactive amino group is required. Preferably an excess of the formamide compound is used so that it also acts as reaction medium. One equivalent of the sulfonyl halide for each reactive amino group must also be present.

In general the reaction proceeds at room temperature and is exothermic. The primary amine and arylsulfonyl halide or thionyl halide are merely admixed in excess formamide compound, the latter acting also as reaction medium. It is convenient in some instances to apply heat in order to accelerate and complete the reaction, but the temperature should no exceed 100° C.

In many instances the hydrohalide or arylsulfonate salt of the formamidine will precipitate directly from the reaction mixture upon cooling. It is preferable, however, to add to the reaction mixture an inert organic solvent such as alcohol, acetone, benzene, etc., in order to complete the crystallization of the product and to effect the removal of impurities and excess formamide compound. In general, the stronger amines tend to produce hydrohalic salts and the weaker amines tend to produce sulfonates. The acid salts may be converted to the free base by neutralization with a basic reagent such as aqueous sodium carbonate, sodium hydroxide, etc. Any other acid salt may be obtained from the free base by treatment with an equivalent proportion of the appropriate organic or inorganic acid. There may thus be obtained such acid addition salts of the formamidines as the hydrohalides, benzenesulfonates, toluenesulfonates, nitrates, sulfates, phosphates, citrates, tartrates, succinates, etc.

Listed below by structural formula are groups of novel compounds which may be produced according to this invention. The cyclic groups may bear one or more of the substituents described above.

(II)
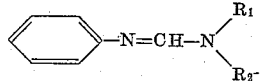

(VII)
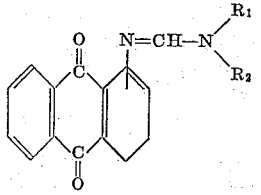

(VIII)
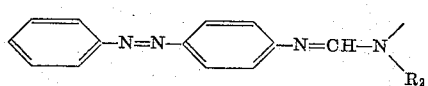

(IX)
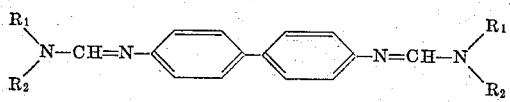

(X)
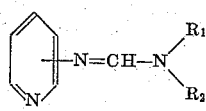

(XI)
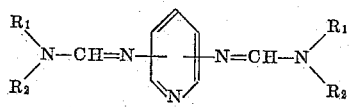

(XII)
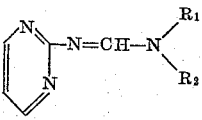

(XIII)
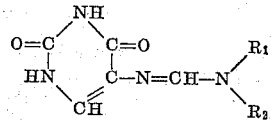

(XIV)
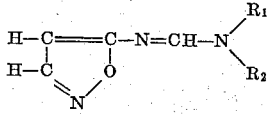

More particularly the novel compounds to which this invention relates are selected from the group consisting of compounds of the formula denoted VIII above, wherein $R_1$ and $R_2$ each represents a member of the group consisting of hydrogen and lower alkyl, monovalent radical ring substituted derivatives thereof and salts of said compounds.

The monovalent radical ring substituents above referred to, besides other formamidino groups, are preferably such groups as carboalkoxy groups such as carbo-lower alkoxy, for example, $COOC_2H_5$, and di-lower alkylaminocarbo-lower alkoxy, for example, $COOC_2H_4N(C_2H_5)_2$; alkylamino such as lower alkylamino and di-lower alkylamino; acylamino groups such as lower alkanoylamino, for example, $NHCOCH_3$; ether and thioether groups such as lower alkoxy and lower alkylmercapto, for example, $CH_3O$, $C_2H_5O$, and di-lower alkylamino-lower alkoxy, for example, $(C_2H_5)_2NC_2H_4O$; alkyl groups, preferably lower alkyl such as methyl, ethyl, propyl, etc.; electronegative acid radicals derived from organic or inorganic acids, such as the halogens, $SO_2$, $NO_2$, OH, COOH, $SO_3H$, sulfamyl, acyl groups such as lower alkanoyl groups, for example, $CH_3CO$, aroyl groups such as benzoyl and substituted benzoyl groups, such as trifluoromethylbenzoyl, arsonyl, thiocyano, and the like. Especially preferred are the compounds of Formula VIII with a lower alkyl group, e.g. methyl, on one or both of the phenyl rings.

The novel compounds are useful in combatting bacterial, protozoal, viral or helmintic pathogens such as Streptococcus hemolyticus, Diplococcus pneumoniae, Encephalitis Col SK, Mycobacterium tuberculosis, Trichomonas vaginalis, Syphacia obvelata. etc. The compounds may be administered orally or parenterally by incorporating therapeutic doses in conventional vehicles.

This application is a continuation-in-part of application Serial No. 700,532, filed December 4, 1957, now United States Patent 3,073,851, granted January 15, 1963.

The following examples are illustrative of the invention. All temperatures are in degrees centigrade.

*Example 1*

25 g. of p-diamino-diphenyl-sulfone were dissolved in 100 cc. of dimethylformamide. 55 g. of p-toluenesulfonyl chloride were added and the mixture was stirred. The mixture was stirred for about one hour. The temperature rose to 74°. The reaction mixture was then poured into 800 cc. of water and 60 cc. of 40% sodium hydroxide. The mixture was stirred for 2 hours and then filtered. The crude crystalline product thus obtained was recrystallized by dissolving in 250 cc. of boiling benzene, filtering off the insoluble impurities and adding 400 cc. of Skellysolve B (an n-hexane fraction) to the benzene filtrate. The mixture was kept overnight in the refrigerator. The crystalline N,N'-(p,p'-sulfonyldiphenylene)bis[N'',N''-dimethylformamidine] thus obtained melted at 131 to 133°.

The procedure described in the preceding paragraph was repeated substituting 50 g. of benzenesulfonyl chloride for the 55 g. of p-toluenesulfonyl chloride. The same product was obtained.

100 cc. of dimethylformamide, 25 g. of p-diamino-diphenyl-sulfone and 50 g. of p-toluenesulfonyl chloride were reacted as described in the first paragraph above. After the temperature dropped to 40°, 200 cc. of alcohol were added and the mixture was heated to reflux. The clear solution which resulted was filtered while hot. 100 cc. of alcohol were added to the filtrate which was permitted to crystallize in the refrigerator. There was obtained white, crystalline N,N'-(p,p'-sulfonyldiphenylene)bis[N'',N'' - dimethylformamidine] p-toluenesulfonate.

*Example 2*

29 g. of mono-acetyldiamino-diphenyl-sulfone, 50 cc. of dimethylformamide and 22 g. of benzenesulfonyl chloride were stirred together, the temperature rising to 64°. The mixture was then stirred for one hour at 60°. The reaction mixture was then drowned in 1000 cc. of water. While stirring, 125 cc. of a 20% sodium carbonate solution were dropped in to neutralize the acid. After 24 hours the solid obtained was filtered, the filter cake was washed with ice water and sucked dry on a funnel. The solid was then dried at 70°. The p-acetamidophenyl-p-(dimethylaminomethyleneamino)phenyl sulfone was then crystallized from 75% acetic acid, M.P. 260 to 262°.

*Example 3*

27 g. of procaine hydrochloride and 25 g. of p-toluenesulfonyl chloride were stirred in 60 cc. of dimethylformamide. The temperature rose to 45°. The mixture was then stirred for 2 hours at 60°. The mixture was diluted with 300 cc. of acetone, stirred one hour at room temperature and then chilled to 5°. The β-diethylaminoethyl-p-(dimethylaminomethyleneamino)benzoate dihydrochloride crystallized as white crystals, M.P. 205 to 206°, from isopropanol-ethanol.

Example 4

30 g. of p-aminoacetanilide and 50 g. of p-toluenesulfonyl chloride in 70 cc. of dimethylformamide were stirred and heated for one hour in a boiling water bath. The mixture was diluted with 50 cc. of alcohol, refluxed for 1½ hours, diluted with 300 cc. of acetone and filtered at 10°. The white, crystalline N-(p-acetamidophenyl)-N',N'-dimethylformamidine hydrochloride, M.P. 273 to 274°, was recrystallized from methanol.

Example 5

28 g. of anthranilic acid and 50 g. of p-toluenesulfonyl chloride in 80 cc. of dimethylformamide were reacted at 90° for one hour. 100 cc. of alcohol were added, the mixture was refluxed for 30 minutes and then cooled to 10°. N-(o-carboxyphenyl)-N',N'-dimethylformamidine hydrochloride crystallized. The white, crystalline hydrochloride was recrystallizezd from 80% alcohol, M.P. 169 to 171°.

Example 6

N-(p-carboxyphenyl)-N',N'-dimethylformamidine hydrochloride, obtained as white crystals melting at 236 to 237° upon crystallization from 93% alcohol, was produced from 28 g. of p-aminobenzoic acid according to the procedure described in Example 5.

Example 7

15.5 g. of p-aminosalicylic acid and 25 g. of p-toluenesulfonyl chloride in 50 cc. of dimethylformamide were stirred together. The temperature rose to 62°. The mixture was diluted with 100 cc. of alcohol and permitted to crysallize. The N-(4-carboxy-3-hydroxyphenyl)-N',N'-dimethylformamidine p-toluenesulfonate obtained was recrystallized from 90% ethanol, M.P. 235°.

Example 8

33 g. of o-aminophenol and 70 g. of p-toluenesulfonyl chloride were reacted in 100 cc. of dimethylformamide. The temperature rose to 70°. The mixture was then heated one hour at 85°. 25 cc. of alcohol were added to the reaction mixture and it was refluxed for ½ hour. 300 cc. of acetone were added at 40° and the mixture was chilled to 10°. The N-(o-hydroxyphenyl)-N,N'-dimethylformamidine hydrochloride was recrystallized from alcohol and precipitated as white crystals, M.P. 156°.

Example 9

According to the procedure described in Example 8, there was obtained from 33 g. of m-aminophenol, N-(m-hydroxyphenyl)-N',N'-dimethylformamidine hydrochloride as grayish crystals, M.P. 241° upon crystallization from 95% alcohol.

Example 10

22 g. of p-aminophenol and 50 g. of p-toluenesulfonyl chloride were stirred in 100 cc. of dimethylformamide. The temperature rose to 55°. The mixture was then heated for one hour at 90°. 200 cc. of ether were added and, after stirring in an ice bath, the ether layer was decanted off. 300 cc. of acetone were added and the mixture was permitted to crystallize in the refrigerator. The N-(p-hydroxyphenyl)-N',N'-dimethylformamide p-toluenesulfonate was recrystallized from alcohol, M.P. 209 to 210°.

Example 11

18 g. of 4-chloro-2-nitroaniline and 22 g. of p-toluenesulfonyl chloride were stirred in 50 cc. of dimethylformamide, the temperature rising to 51°. The mixture was then heated for one hour at 80 to 85°. 300 cc. of acetone were added at 40° and the precipitate which formed was filtered off. The N,N-dimethyl-N'-(4-chloro-2-nitrophenyl)formamidine hydrochloride was recrystallized from 95% alcohol, M.P. 205°.

Example 12

16 g. of 4-nitro-2-aminotoluene and 25 g. of p-toluenesulfonyl chloride were stirred in 50 cc. of dimethylformamide, the temperature rising to 63°. The mixture was then stirred at room temperature for one hour. 300 cc. of acetone were added and the mixture was placed in the refrigerator to crystallize. The N,N-dimethyl-N'-(2-methyl-5-nitrophenyl)formamidine hydrochloride was recrystallized from 90% alcohol, M.P. 205°.

Example 13

17 g. of 4-methoxy-2-nitroaniline and 25 g. of p-toluenesulfonyl chloride in 25 cc. of dimethylformamide were reacted as described in Example 12. The N,N-dimethyl-N'-(2-nitro-4-methoxyphenyl)-formamidine hydrochloride was crystallized from acetonitrile, M.P. 198 to 200°.

Example 14

26 g. of m-chloroaniline and 50 g. of p-toluenesulfonyl chloride in 70 cc. of dimethylformamide were stirred together, the temperature rising to 74°. 100 cc. of alcohol were added, the mixture was heated ½ hour to reflux and then filtered. N-(3-chlorophenyl)-N',N'-dimethylformamidine hydrochloride crystallized from the filtrate. Upon recrystallization from acetonitrile-alcohol, the white crystalline hydrochloride melted at 233°.

Example 15

32 g. of 2,5-dichloroaniline and 50 g. of p-toluenesulfonyl chloride in 80 cc. of dimethylformamide were stirred without heating for one hour and then heated for one hour at 90°. 150 cc. of alcohol were added, the mixture was refluxed for ½ hour and then filtered. After addition of 300 cc. of acetone to the filtrate, (N-(2,5-dichlorophenyl)-N',N'-dimethylformamidine hydrochloride crystallized. Upon recrystallization from alcohol, the hydrochloride melted at 232°.

Example 16

32 g. of 3,4-dichloroaniline and 45 g. of benzenesulfonyl chloride in 100 cc. of dimethylformamide were stirred together, the temperature rising to 60°. The mixture was stirred for 2 hours at 60° and then diluted with 300 cc. of acetone. The mixture was then filtered at room temperature. The N-(3,4-dichlorophenyl)-N',N'-dimethylformamidine hydrochloride thus obtained, upon recrystallization from 90% alcohol, melted at 255 to 256°.

Example 17

20 g. of 2,4,5-trichloroaniline and 25 g. of p-toluenesulfonyl chloride in 50 cc. of dimethylformamide were stirred at room temperature for one hour, then heated at 85° for one hour. The mixture was cooled to 40° and 200 cc. of acetone were added. Crystalline N,N-dimethyl-N'-(2,4,5-trichlorophenyl)formamidine hydrochloride precipitated. The product was filtered, washed with acetone and dried at 70°. Upon recrystallization from acetonitrilemethanol, the product melted at 225 to 227°.

The hydrochloride obtained above was dissolved in water and made alkaline with 1N sodium hydroxide. The free base, N,N-dimethyl-N'-(2,4,5-trichlorophenyl)formamidine, was obtained as white crystals, M.P. 85° after recrystallization from acetonitrile.

Example 18

41 g. of 2,6-dichloro-4-nitroaniline and 42 g. of benzenesulfonyl chloride in 100 cc. of dimethylformamide were stirred together, the temperature rising to 42°. The mixture was heated in a water bath for one hour at 90°. 50 cc. of alcohol were added, the mixture was refluxed for 15 minutes, cooled to 40° and 400 cc. of acetone were added. The precipitate which formed was filtered, dissolved in 250 cc. of water and 25 cc. of concentrated hydrochloric acid at room temperature and filtered again. The filtrate was neutralized with approximately 40 cc. of sodium hydroxide. The crystalline N,N-dimethyl-N'-

(2,6-dichloro - 4 - nitrophenyl)formamidine was recrystallized from alcohol, M.P. 160 to 162°.

*Example 19*

15 g. of aniline hydrochloride and 25 g. of benzenesulfonyl chloride in 50 cc. of dimethylformamide were stirred at room temperature for one hour. The mixture was then heated in a water bath at 80° until a sample, treated with 1N-HCl and 1N-NaNO$_2$ showed no diazo reaction. The mixture was cooled to room temperature, 200 cc. of acetone were added and the mixture was stirred in an ice bath. The crystalline N-phenyl-N',N'-dimethylformamidine hydrochloride which precipitated was filtered, dried at 75° and recrystallized from isopropanol, M.P. 223 to 225°.

The free base, N-phenyl-N',N'-dimethylformamidine, was obtained by treating the hydrochloride with a dilute solution of sodium hydroxide, extracting with ether, concentrating the ether solution and distilling the ether concentrate in vacuo. The base was obtained as a colorless oil, B.P. 75 to 76°/0.02 mm.

*Example 20*

35 g. of p-phenetidine hydrochloride and 50 g. of p-toluenesulfonyl chloride in 60 cc. of dimethylformamide where stirred together, the temperature rising to 64°. The diazo reaction of the mass was negative. The mixture was diluted with 400 cc. of acetone and placed in the refrigerator to crystallize. The mixture was filtered and the N-(p-ethoxyphenyl)-N',N'-dimethylformamidine p-toluenesulfonate was recrystallized from isopropanol, M.P. 169 to 170°.

*Example 21*

28 g. of o-nitroaniline and 45 g. of p-toluenesulfonyl chloride in 100 cc. of dimethylformamide were stirred together, the temperature rising to 60°. The mixture was then stirred and heated in a water bath for one hour at 90 to 95°. The reaction mixture was then diluted at 80° with 300 cc. of benzene and chilled to 5°. The N-(o-nitrophenyl)-N',N'-dimethylformamidine hydrochloride which precipitated was filtered off, washed with benzene and recrystallized from acetonitrile-ethanol, M.P. 224 to 225°.

*Example 22*

28 g. of m-nitroaniline an 45 g. of p-toluenesulfonyl chloride in 100 cc. of dimethylformamide were stirred together, the temperature rising to 62°. The mixture was then heated for 2 hours at 90 to 95°, 200 cc. of alcohol were added and the mixture was refluxed for ½ hour. The clear solution was filtered through a folded filter. N-(m-nitrophenyl)-N',N'-dimethylformamidine hydrochloride crystallized from the filtrate. Upon recrystallization from 90% alcohol, the compound melted at 248 to 250°.

*Example 23*

28 g. of p-nitroaniline and 45 g. of p-toluenesulfonyl chloride in 150 cc. of dimethylformamide were stirred together, the temperature rising to 62°. When the temperature had fallen to 40°, the reaction mixture was heated at 85° for one hour. The mixture was diluted with 300 cc. of alcohol, refluxed until a clear solution was obtained and the solution was filtered hot. The N-(p-nitrophenyl) N',N'-dimethylformamidine p-toluenesulfonate crystallized from the filtrate, M.P. 240 to 242°.

42 g. of N-(p-nitrophenyl)-N',N'-dimethylformamidine p-toluenesulfonate were dissolved at 90° in 500 cc. of water and the solution was filtered while hot. The filtrate was made alkaline with about 30 cc. of sodium hydroxide. The free base, N-(p-nitrophenyl)-N',N'-dimethylformamidine, precipitated and was recrystallized from benzene-Skellysolve B, M.P. 79 to 80°.

*Example 24*

22 g. of arsanilic acid and 50 cc. of dimethylformamide were stirred together. 25 g. of p-toluenesulfonyl chloride were added with the temperature rising to 60°. The reaction mixture was heated for one hour at 80°, ½ hour at 95° and another half hour at 105°. The mixture was cooled to 30°, diluted with 250 cc. of acetone and then chilled to 10°. The mixture was filtered after 2 hours and the residue was washed with acetone. The 4-(N,N-dimethylformamidino)benzenearsonic acid hydrochloride was crystallized from dilute alcohol, M.P. 221 to 222°.

*Example 25*

20 g. of 1-amino-anthraquinone and 30 g. of p-toluenesulfonyl chloride in 100 cc. of dimethylformamide were heated at 95° for one hour. The mass was diluted with 250 cc. of alcohol, refluxed until a clear solution was obtained and filtered while hot. 1-(N,N-dimethylformamidino)anthraquinone toluenesulfonate crystallized from the filtrate, M.P. 185°.

*Example 26*

37.5 g. of o-tolylazo-o-toluidine hydrochloride and 35 g. of p-toluenesulfonyl chloride in 100 cc. of dimethylformamide were stirred together, the temperature rising to 50°. The mixture was heated at 90° for one hour and then diluted at 50° with 300 cc. of water. The mixture was stirred for 3 hours, filtered and the residue was washed with a little ice water. The 5-o-tolylazo-2-(N,N-dimethylformamidino)toluene p-toluenesulfonate was dried in vacuo at 60° and crystallized from alcohol, M.P. 166 to 167°.

*Example 27*

18 g. of sulfanilic acid and 22 g. of p-toluenesulfonyl chloride in 60 cc. of dimethylformamide were stirred together, the temperature rising to 55°. The mixture was heated one hour at 80°. The diazo reaction was negative. The mixture was diluted at 80° with 100 cc. of alcohol and stirred for one hour, then filtered at 10°. The N-(dimethylaminomethyleneamino)sulfanilic acid was crystallized from 60% alcohol, M.P. 308° (with dec.).

*Example 28*

17 g. of dianisidine hydrochloride and 20 g. of benzenesulfonyl chloride in 50 cc. of dimethylformamide were stirred at room temperature for one hour, then heated at 85° for an additional hour. The diazo reaction was then negative. The mixture was diluted at 60° with 200 cc. of acetone, cooled to 10° and filtered. The N,N'-bis[dimethylaminomethylene]-4,4'-o-dianisidine dihydrochloride was crystallized from alcohol, M.P. 268° (with dec.).

*Example 29*

24 g. of p-aminoazobenzene hydrochloride and 25 g. of p-toluenesulfonyl chloride in 50 cc. of dimethylformamide were stirred together, the temperature rising to 56°. The mixture was heated for ½ hour at 80°, diluted with 175 cc. of alcohol, heated to reflux for ½ hour and the clear solution was then filtered while hot. p-(Dimethylaminomethyleneamino)azobenzene p-toluenesulfonate crystallized from the filtrate, M.P. 198 to 199°.

*Example 30*

Hydrogen chloride gas was passed into a suspension of 47 g. of 2-aminopyridine in 300 cc. of toluene at a temperature of 5 to 15° C. until saturated. 2-aminopyridine dihydrochloride separated as an oil. The oil was added to 200 cc. of dimethylformamide. 130 g. of p-toluenesulfonyl chloride were added with stirring. The mixture was stirred at room temperature for one hour and then at 60° for 2 hours. It was then cooled to 20°, diluted with 400 cc. of acetone and chilled to 10°. The white, crystalline 2 - (N,N-dimethylformamidino)pyridine dihydrochloride was then filtered off and recrystallized from methanol-acetone, M.P. 178°.

*Example 31*

37 g. of 2,6-diaminopyridine hydrochloride and 70 g. of p-toluenesulfonyl chloride in 100 cc. of dimethylformamide were stirred together, the temperature rising to 80°. The mixture was stirred at 80° for one hour, 50 cc. of alcohol were added and the mixture was refluxed for ½ hour. 200 cc. of acetone were added at 20°, the mixture was stirred for one hour and then filtered at 10°. The filter cake was dried in a desiccator over sulfuric acid. The 2,6-bis(N,N-dimethylformamidino)pyridine dihydrochloride was crystallized from methanol-acetone, M.P. 289 to 290°.

*Example 32*

26 g. of 6-methoxy-8-aminoquinoline hydrochloride and 25 g. of benzenesulfonyl chloride in 100 cc. of dimethylformamide were stirred together, the temperature rising to 61°. The mixture was heated at 80° for one hour, diluted at 60° with 300 cc. of acetone, chilled to 10° and filtered. The 6-methoxy-8-(dimethylaminomethyleneamino)quinoline dihydrochloride, upon crystallization from 90% alcohol, melted at 210 to 212°.

The free base, 6-methoxy-8-(dimethylaminomethyleneamino)quinoline, was obtained by dissolving the dihydrochloride obtained above in water and making the solution alkaline with 1N sodium hydroxide. The free base crystallized from acetonitrile in the form of white needles, M.P. 158°.

*Example 33*

21.5 g. of 4,6-diaminoquinaldine dihydrochloride and 35 g. of p-toluenesulfonyl chloride in 150 cc. of dimethylformamide were stirred for one hour at room temperature. The mixture was stirred at 90° for one hour. The diazo reaction was negative. The mixture was diluted at 60° with 300 cc. of acetone, cooled to 20° and the precipitate was filtered off. The 6-(dimethylaminomethyleneamino)-4-aminoquinaldine dihydrochloride was crystallized from dilute alcohol, M.P. 288°.

The free base, 6-(dimethylaminomethyleneamino)-4-aminoquinaldine, was obtained by dissolving the dihydrochloride obtained above in water and making the solution alkaline with sodium hydroxide. The free base was obtained as off-white crystals upon crystallization from acetonitrile, M.P. 223 to 224°.

*Example 34*

26 g. of 2-aminopyrimidine hydrochloride and 42 g. of benzenesulfonyl chloride in 50 cc. of dimethylformamide were stirred together, the temperature rising to 41°. The mixture was heated at 90° for one hour and then diluted at 40° with 300 cc. of acetone. N,N-dimethyl-N'-(2-pyrimidyl)formamidine hydrochloride crystallized and was filtered at 10°. The hydrochloride was recrystallized from acetonitrile, M.P. 212°.

*Example 35*

23 g. of 5-amino-3,4-dimethylisoxazole and 50 g. of p-toluenesulfonyl chloride in 50 cc. of dimethylformamide were stirred together, the temperature rising to 75°. The mixture was heated for one hour at 85°. It was then diluted at 30° with 400 cc. of acetone and filtered at 10°. The residue, N,N-dimethyl-N'-(3,4-dimethyl-5-isoxazolyl)formamidine p-toluenesulfonate was crystallized from alcohol, M.P. 145°.

*Example 36*

20 g. of 2-aminothiazole and 50 g. of p-toluenesulfonyl chloride in 50 cc. of dimethylformamide were stirred together, the temperature rising to 61°. The mixture was heated for ½ hour at 85°. It was then diluted with 400 cc. of acetone at 60° and chilled to 10°. The white, crystalline N,N-dimethyl-N'-(2-thiazolyl)formamidine hydrochloride was filtered and recrystallized from isopropanol-acetone, M.P. 168 to 170°.

*Example 37*

21 g. of N,N-diallylmelamine and 25 g. of p-toluenesulfonyl chloride in 100 cc. of dimethylformamide were stirred for one hour at room temperature. The mixture was heated for ½ hour at 60°, one hour at 80° and then ½ hour at 85°. At room temperature it was diluted with 300 cc. of water and 30 cc. of 40% sodium hydroxide. The mixture was stirred for 2½ hours at room temperature and the white precipitate was then filtered off. The 2-diallylamino-4-amino-6-(N,N-dimethylformamidine)-S-triazine was crystallized from acetonitrile, M.P. 174°.

*Example 38*

2.5 g. of 5-aminouracil and 5 g. of p-toluenesulfonyl chloride and 6 cc. of dimethylformamide were heated in a water bath at 90°. The melt was diluted with 4 cc. of alcohol and 20 cc. of acetone. The precipitated 5-(dimethylaminomethyleneamino) - 2,4-dioxo-1,2,3,4-tetrahydropyrimidine hydrochloride was filtered at 10° and crystallized from 85% ethanol, M.P. higher than 350°.

*Example 39*

14 g. of p-nitroaniline and 22 g. of p-toluenesulfonyl chloride in 50 cc. of formamide were stirred together, the temperature rising to 50°. The mixture was then stirred at 60° for one hour and 70° for 2 hours. 150 cc. of alcohol were added and the mixture was heated to reflux. The clear solution was filtered while hot. N-(p-nitrophenyl)formamidine p-toluenesulfonate crystallized from the filtrate and was recrystallized from alcohol, M.P. 202°.

The procedure described above was repeated utilizing 20 g. of benzenesulfonyl chloride to obtain N-(p-nitrophenyl)formamidine benzenesulfonate, M.P. 225 to 227°.

*Example 40*

20 g. of p-nitroaniline, 35 g. of p-toluenesulfonyl chloride and 50 cc. of diethylformamide were heated in a boiling water bath for one hour until a clear light yellow solution was formed. The solution was diluted with 100 cc. of alcohol, heated to reflux for 15 minutes and filtered while hot. The filtrate was cooled to 10° and 200 cc. of ice water were added. N-(p-nitrophenyl)-N',N'-diethylformamidine p-toluenesulfonate crystallized in needles. The compound was filtered, washed with a little ice water, dried in the oven and recrystallized from dilute alcohol, M.P. 160 to 162°.

The free base, N-(p-nitrophenyl)-N',N'-diethylformamidine, was obtained by dissolving the p-toluenesulfonate in water, filtering and making the filtrate alkaline with aqueous sodium carbonate solution. The yellow, crystalline base melted at 59 to 60°.

*Example 41*

2 g. of p-nitroaniline, 3.5 g. of p-toluenesulfonyl chloride and 5 cc. of methylformamide were heated for ½ hour in a boiling water bath. The mixture was diluted with 15 cc. of alcohol, heated until solution was obtained and then filtered while hot. N-(p-nitrophenyl)-N'-methylformamidine p-toluenesulfonate crystallized from the filtrate. Upon recrystallization from alcohol, the compound melted at 175°.

*Example 42*

41 g. of 2-amino-6-hydroxybenzothiazole and 50 g. of p-toluenesulfonyl chloride in 100 cc. of dimethylformamide were stirred together, the temperature rising to 65°. The mixture was heated and stirred for 2 hours at 80°. It was diluted at 60° with 300 cc. of acetone. 2-(N,N-dimethylformamidino) - 6-hydroxybenzothiazole hydrochloride precipitated, was filtered and dried, M.P. 230°.

15 g. of the hydrochloride obtained above were dissolved in 200 cc. of water at 60° and filtered. 50 cc. of sodium acetate solution (20%) were added to the filtrate. The free base, 2-(N,N-dimethylformamidino)-6-hydroxybenzothiazole, precipitated, was filtered off and dried, M.P. 237°.

*Example 43*

22 g. of 2 - (N,N-dimethylformamidino)-6-hydroxybenzothiazole, 300 cc. of chlorobenzene, 7 g. of sodium methoxide and 50 cc. of methanol were stirred for one hour at room temperature. The methanol was then distilled off. 20 g. of diethylaminoethyl chloride were added at 90° and the reaction mass was heated for 3 hours to reflux at 130°. It was then cooled below 100°, 200 cc. of water and 10 cc. of sodium hydroxide were added and the mixture was stirred for one hour. The chlorobenzene layer was separated, dried with sodium sulfate, filtered and concentrated in vacuo. The oily residue was crystallized from acetonitrile and recrystallized from benzine (B.P. 30 to 60°). The yellow crystalline 2 - (N,N-dimethylformamidino)-6-($\beta$-diethylaminoethoxy)benzothiazole melted at 69 to 70°.

The free base obtained above was converted into the oxalate by mixing an ether solution of the base with an ether solution of oxalic acid. The oxalate precipitated and was crystallized from methanol, M.P. 162 to 163°.

*Example 44*

34 g. of 3-aminopyridine dihydrochloride and 45 g. of p-toluenesulfonyl chloride in 100 cc. of dimethylformamide were stirred together, the temperature rising to 71°. The mixture was heated for one hour at 80°. It was diluted at 40° with 300 cc. of acetone and chilled to 10°. The crystalline precipitate, 3-(N,N-dimethylformamidino)pyridine dihydrochloride, was filtered and recrystallized from methanol-ethanol, M.P. 228° (with dec.).

*Example 45*

26 g. of 4-aminopyridine hydrochloride and 44 g. of p-toluenesulfonyl chloride in 100 cc. of dimethylformamide were stirred together, the temperature rising to 38°. The mixture was heated for 2 hours at 60°. A sandy precipitate formed. The mixture was diluted with 300 cc. of acetone, chilled to 10° and filtered. 4-(N,N-dimethylformamidino)pyridine dihydrochloride was obtained as white crystals, M.P. 260 to 261° (with dec.), upon crystallization from methanol-acetonitrile.

*Example 46*

13 g. of 2-amino-5-nitrothiazole hydrochloride and 22 g. of p-toluenesulfonyl chloride in 50 cc. of dimethylformamide were stirred together, the temperature rising to 47°. The reaction mixture was stirred and heated for 2 hours at 80 to 85°. It was diluted at 40° with 200 cc. of acetone, chilled to 10° and filtered. The residue was dried at 75° and crystallized from acetonitrile. The 2-(dimethylaminomethyleneamino) - 5-nitrothiazole hydrochloride melted at 178 to 180°.

*Example 47*

25 g. of p-diamino-diphenyl-sulfone and 50 cc. of dimethylformamide were stirred. 26 g. of thionyl chloride were dropped in at a temperature below 20°. The mixture was stirred for one hour at room temperature, 2 hours at 60 to 65° and 2 hours at 80 to 90°. The diazo reaction was negative. The mixture was diluted at room temperature with 150 cc. of water and filtered through a folded filter. The filtrate was made alkaline with sodium hydroxide. The white precipitate, N,N'-(p,p'-sulfonyldiphenylene)bis[N'',N''-dimethylformamidine], was filtered, washed with water, dried and crystallized from Skellysolve C (a normal heptane fraction), M.P. 130 to 133°.

*Example 48*

22 g. of p-aminophenol and 50 cc. of dimethylformamide were stirred. 26 g. of thionyl chloride were dropped in at a temperature below 20°. The mixture was stirred for one hour at room temperature, then heated one hour at 60°, one hour at 80° and 2 hours at 95°. The diazo reaction was negative. The mixture was diluted with 25 cc. of alcohol and 200 cc. of acetone. An additional 400 cc. of acetone were added and the mixture was placed in the refrigerator to crystallize. The N-(p-hydroxyphenyl)-N',N'-dimethylformamidine hydrochloride was recrystallized from methanol-acetone, M.P. 198 to 200°. By treatment of the hydrochloride with sodium carbonate solution, N-(p-hydroxyphenyl)-N',N'-dimethylformamidine precipitated. The free base was crystallized from alcohol, M.P. 197 to 199°.

*Example 49*

69 g. of p-phenetidine hydrochloride and 100 cc. of dimethylformamide were stirred. 52 g. of thionyl chloride were dropped in at a temperature below 20°. The temperature was permitted to rise slowly to 30°. The mixture was then heated in a water bath to 40°, one hour at 60°, one hour at 80° and one hour at 90°. The diazo reaction was then negative. The mixture was diluted with 200 cc. of water and then made alkaline at 15° to 22° with 150 cc. of sodium hydroxide and 25 cc. of sodium carbonate (20%). 300 cc. of ether were added. The ether layer was separated, chilled in an ice bath and 20 g. of concentrated sulfuric acid were added. The ether was decanted off. The residue was crystallized from 200 cc. of acetonitrile and filtered. The N-(p-ethoxyphenyl)-N',N'-dimethylformamidine sulfate melted at 158 to 160°.

*Example 50*

42 g. of p-nitroaniline and 100 cc. of dimethylformamide were stirred. 3.9 g. of thionyl chloride were added at a temperature below 20°. The mixture was heated to 30° and the temperature then rose to 68°. N-(p-nitrophenyl)-N',N'-dimethylformamidine hydrochloride crystallized. The mixture was diluted with 400 cc. of acetone and filtered. The residue was sucked dry on a funnel and then dried in a desiccator over sulfuric acid. The product was recrystallized from alcohol, M.P. 261°.

*Example 51*

45 g. of 4-o-tolylazo-o-toluidine and 100 cc. of dimethylformamide were stirred. 26 g. of thionyl chloride were added at a temperature below 20°. The mixture was stirred at room temperature and then the temperature rose to 48°. The diazo reaction was negative. The mixture was stirred for an additional 2 hours at room temperature, then 300 cc. of acetone were added. The 5-o-tolylazo-2-(N,N-dimethylformamidino)toluene hydrochloride was filtered off, M.P. 198 to 200°.

*Example 52*

15 g. of 4-aminoacetanilide was dissolved in 200 cc. of boiling acetonitrile and the resulting solution filtered. 15 cc. of isopropanol-hydrochloric acid (20%) was added to the filtrate whereupon 4-aminoacetanilide hydrochloride crystallized. A mixture of 3.8 g. of 4-aminoacetanilide hydrochloride, 5 cc. of dimethylformamide and 5 cc. of benzene sulfochloride was heated to 95°. Following continued heating on a steam bath for 30 minutes, the reaction mixture was cooled to 30° and diluted with 50 cc. of acetone. The resulting crystalline prepipitate was filtered off yielding 4-(dimethylaminomethyleneamino)-acetanilide hydrochloride melting at 284–285°. The free base was obtained by dissolving the hydrochloride salt in water and rendering the resulting solution alkaline with sodium carbonate. The base crystallizes from water and melts at 186–188°. By heating 4-(dimethylaminomethyleneamino)-acetanilide with hydrochloric acid (1:1) to 95° for a short time, the resulting hydrolyzed compound, 4-(dimethylaminomethyleneamino)-aniline was obtained. It crystallized as the dihydrochloride.

*Example 53*

A mixture of 4 g. of m-aminoacetanilide, 6 cc. of dimethylformamide and 2.6 g. of methyl sulfochloride was heated to 110°. Upon dilution with acetone, crystals of 3 - (dimethylaminomethyleneamino) - acetanilide hydrochloride precipitated and were filtered off, and upon recrystallization from methanol melted at 278°.

Example 54

A mixture of 15 g. of p-thiocyanoaniline, 30 cc. of dimethylformamide and 20 g. of p-toluene sulfochloride was heated on a steam bath to 90° for 30 minutes. The reaction mixture was then diluted with 200 cc. of acetone and chilled to 10° whereupon 1-(dimethylaminomethyleneamino)-4-thiocyanobenzene hydrochloride crystallized. The product was filtered off, washed with acetone and recrystallized from ethanol forming white crystals melting at 215–218°.

Reaction of 9 g. of p-thiocyanoaniline hydrochloride, 20 cc. of dimethylformamide and 10 g. of p-toluene sulfochloride yielded the same compound, also as white crystals of the hydrochloride melting at 215–218° (recrystallized from ethanol).

Example 55

A mixture of 2.5 g. of 5-thiocyano-2-aminobenzophenone, 5 cc. of dimethylformamide and 2 g. of p-toluene sulfochloride were heated together at 85°. A clear orange colored melt was obtained and was diluted with ca. 40 cc. of acetone, whereupon 2-(dimethylaminomethyleneamino)-5-thiocyanobenzophenone hydrochloride crystallized as light yellow crystals melting at 164°. The product was water soluble.

Example 56

A mixture of 2.5 g. of 5-thiocyano-2'-trifluoromethyl-2-aminobenzophenone, 4 cc. of dimethylformamide, and 2 g. of p-toluene sulfochloride was heated to 90° on a water bath. After 15 minutes the melt was diluted with water and rendered alkaline with sodium carbonate solution. Upon standing, the first oily precipitate formed white crystals which were filtered off and washed with water. Upon recrystallization from ethanol, 5-thiocyano-2'-trifluoromethyl-2-(dimethylaminomethyleneamino)-benzophenone was obtained as crystals melting at 123.5–125°.

Example 57

34 g. of sufanilamide, 100 cc. of dimethylformamide and 42 g. of benzene sulfochloride were stirred together whereupon the mixture of the temperature rose to 80°. It was then stirred for one hour whereupon the temperature dropped to 60°. Then 300 cc. of ethanol were added and the resulting mixture was permitted to stand for 24 hours, after which it was diluted with 400 cc. of water and the resulting precipitate filtered off and crystallized from dioxane-water (1:1) yielding 4-(dimethylaminomethyleneamine)-benzene sulfonamide as white crystals melting at 221–223°.

Example 58

7.5 g. of 1,4,5,8-tetraaminoanthraquinone, 40 cc. of dimethylformamide and 15 cc. of benzene sulfochloride were stirred together whereupon the temperature of the mixture rose to 55°. It was then heated for one hour at 90°. The resulting thick reaction mix was diluted with 100 cc. of acetone at 45° and the resulting precipitate filtered off, yielding 1,4,5,8-tetra-(dimethylaminomethyleneamino)-anthraquinone tetra-benzene sulfonate as olive green crystals. By reacting 1.5 g. of 1,4,5,8-tetraaminoanthraquinone, 5 cc. of dimethylformamide and 2 cc. of thionyl chloride, 1,4,5,8-tetra-(dimethylaminomethyleneamino)-anthraquinone tetrahydrochloride was obtained as metallic shining crystals. Both the sulfonate and the tetrahydrochloride were soluble in water.

Example 59

24 g. of 1-amino-4-hydroxy-anthraquinone was stirred with 100 cc. of dimethylformamide and with the temperature maintained below 20°, 15 g. of thionyl chloride was added thereto. The reaction mixture was then heated at 60° for 2 hours, following which the resultant reaction mix was diluted with 300 cc. of acetone at 40°. The resulting precipitate was filtered off at 20°, yielding 1-(dimethylaminomethyleneamino)-4-hydroxy-anthraquinone hydrochloride as metallic shiny crystals melting at 236° (decomp.). By using p-toluene sulfochloride, instead of thionyl chloride, the p-toluene sulfonate was obtained. It melted at 241° (decomp.).

Example 60

25 g. of 2,6-diamino-3-phenylazopyridine hydrochloride and 100 cc. of dimethylformamide were stirred together and 26 g. of thionyl chloride was added thereto below 20°. The temperature of the mixture then rose to 60° and the mixture was stirred for two hours at 60°, following which it was diluted with 400 cc. of acetone at 40°. The resulting solution was chilled to 10° and then filtered. The filter cake so-obtained was dried at 60–70° and crystallized from isopropanol yielding 2,6-bis-(N,N-dimethylformamidino)-3-phenylazopyridine dihydrochloride as yellow crystals.

Example 61

A mixture of 20 g. of 4-methylmercaptoaniline hydrochloride, 40 cc. of dimethylformamide and 25 g. of p-toluenesulfonyl chloride were heated on a steam bath to 85° for one hour. The mixture was then cooled to 40° and the reaction mass diluted with 350 cc. of acetone, whereupon white crystals of N-(p-methylmercaptophenyl)-N',N'-dimethylformamide p-toluene sulfonate formed and were filtered off with suction and then air-dried. Upon recrystallization from ethanol, the product melted at 211–212°.

I claim:
1. A compound selected from the group consisting of compounds of the formula

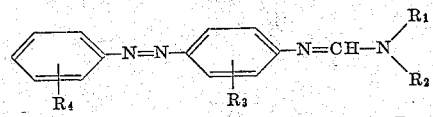

and acid addition salts thereof, wherein $R_1$, $R_2$, $R_3$, and $R_4$ are each selected from the group consisting of hydrogen and lower alkyl.
2. 5-o-tolylazo-2-(N,N-dimethylformamidino)toluene.
3. p-(N,N-dimethylformamidino)-azobenzene.

No references cited.

UNITED STATES PATENT OFFICE
CERTIFICATE OF CORRECTION

Patent No. 3,153,033            October 13, 1964

Norbert Steiger

It is hereby certified that error appears in the above numbered patent requiring correction and that the said Letters Patent should read as corrected below.

Column 3, lines 21 to 24, Formula VIII should appear as shown below instead of as in the patent:

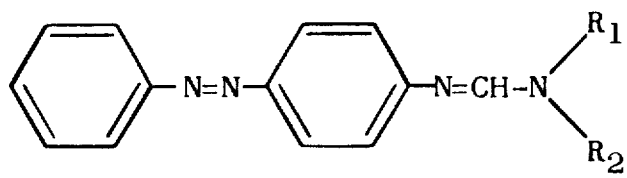

column 5, line 19, for "recrystallizezd" read -- recrystallized --; line 34, for "crysallize " read -- crystallize --; line 44, for "-N,N'-" read -- -N',N'- --; column 6, line 34, for "(N-" read -- N- --; column 7, line 44, for "an" read -- and --; column 12, line 27, for "3.9 g." read -- 39 g. --; column 13, line 51, for "methylaminomethyleneamine" read -- methylaminomethyleneamino --; column 14, line 43, for "-dimethylformamide" read -- -dimethylformamidine --.

Signed and sealed this 27th day of April 1965.

(SEAL)
Attest:

ERNEST W. SWIDER            EDWARD J. BRENNER
Attesting Officer            Commissioner of Patents